(12) United States Patent
Stuber (10) Patent No.: US 8,909,917 B2
(45) Date of Patent: Dec. 9, 2014

(54) SECURE REMOTE METER ACCESS

(75) Inventor: Michael T. Garrison Stuber, Newman Lake, WA (US)

(73) Assignee: Itron, Inc., Liberty Lake, WA (US)

(*) Notice: Subject to any disclaimer, the term of this patent is extended or adjusted under 35 U.S.C. 154(b) by 584 days.

(21) Appl. No.: 12/497,438

(22) Filed: Jul. 2, 2009

(65) Prior Publication Data
US 2011/0004764 A1    Jan. 6, 2011

(51) Int. Cl.
| | | |
|---|---|---|
| *H04L 29/06* | (2006.01) | |
| *G06F 21/44* | (2013.01) | |
| *H04L 9/32* | (2006.01) | |
| *H04W 12/06* | (2009.01) | |
| *G01D 4/00* | (2006.01) | |
| *H04W 12/08* | (2009.01) | |

(52) U.S. Cl.
CPC ............ *G01D 4/004* (2013.01); *H04L 2209/80* (2013.01); *Y04S 20/325* (2013.01); *H04L 63/0807* (2013.01); *G06F 21/44* (2013.01); *Y02B 90/246* (2013.01); *Y02B 90/242* (2013.01); *H04W 12/08* (2013.01); *Y04S 20/322* (2013.01); *H04L 9/3247* (2013.01); *H04W 12/06* (2013.01); *Y02B 90/243* (2013.01); *H04L 63/0823* (2013.01); *Y04S 20/42* (2013.01); *H04L 9/3213* (2013.01); *H04L 9/3263* (2013.01); *G01D 4/006* (2013.01)
USPC ................. 713/156; 713/170; 726/4; 726/29; 380/271

(58) Field of Classification Search
CPC ..... H04L 9/32–9/3231; H04L 9/3236–9/3257; H04L 9/3263–9/3268; H04L 9/3281–9/3297; H04L 63/08–63/0892; H04W 12/06–12/10; G06F 21/30–21/46; G06F 21/602–21/629; G01D 4/002–4/008

USPC .................... 709/217, 223, 225; 713/55–159, 713/168–181; 726/2–10, 26–30; 380/270–271

See application file for complete search history.

(56) References Cited

U.S. PATENT DOCUMENTS

| | | |
|---|---|---|
| 5,897,607 A | 4/1999 | Jenney et al. |
| 2005/0144437 A1* | 6/2005 | Ransom et al. ............... 713/151 |
| 2007/0022469 A1 | 1/2007 | Cooper et al. |
| 2007/0239317 A1 | 10/2007 | Bogolea et al. |
| 2008/0306849 A1* | 12/2008 | Johnson et al. .................. 705/35 |
| 2009/0136042 A1* | 5/2009 | Veillette ........................ 380/279 |

OTHER PUBLICATIONS

C. Neuman; T. Yu; S. Hartman; K. Raeburn. "The Kerberos Network Authentication Service (V5)". Request for Comments: 4120. <http://tools.ietf.org/pdf/rfc4120>. Published: Jul. 2005.*

(Continued)

*Primary Examiner* — Linglan Edwards
*Assistant Examiner* — Kevin Bechtel
(74) *Attorney, Agent, or Firm* — Hanley, Flight & Zimmerman, LLC (57) ABSTRACT

Generally described, the disclosed subject matter is directed to improved processes for securely accessing a meter. In accordance with one embodiment, a method for providing a mobile meter reader with an authorization that may be used to establish a secure session with a meter is implemented. In particular, the method includes issuing a request for authorization to access the meter from the mobile meter reader. If the mobile meter reader maintains sufficient rights, an authorization having an encoded digital signature is generated at a host computer system and provided to the mobile meter reader. Then the method formulates and transmits an authorization command to the meter having the encoded digital signature that was generated by the host computing system.

29 Claims, 6 Drawing Sheets

(56) References Cited

OTHER PUBLICATIONS

International Search Report for PCT International Application No. PCT/US10/39288, date of mailing: Aug. 23, 2010.
Written Opinion of the International Searching Authority for PCT International Application No. PCT/US10/39288, date of mailing: Aug. 23, 2010.
IP Australia, "Patent Examination Report No. 1," issued in connection with Application No. 2010266557, May 3, 2013, 3 pages.
Canadian Intellectual Property Office, "Examiner's Report," issued in connection with Application No. 2,761,950, Aug. 12, 2013, 9 pages.
Canadian Intellectual Property Office, "Notice of Allowance," issued in connection with Canadian Application No. 2,761,950, on Jul. 17, 2014 (1 page).
IP Australia, "Notice of Acceptance," issued in connection with Application No. 2010266557, Apr. 2, 2014, 2 pages.
Canadian Intellectual Property Office, "Examiner's Report," issued in connection with Application No. 2,761,950, Mar. 3, 2014, 8 pages.
Feb. 14, 2012 Office Action issued in Canadian Patent Application No. 2,761,950.
Jun. 4, 2012 Office Action issued in Canadian Patent Application No. 2,761,950.
Itron, "Openway by Itron Security Overview", *Itron White Paper*, pp. 1-6, 2008.
Certicom, "Critical Infrastructure Protection for AMI Using a Comprehensive Security Platform", *Certicom WhitePaper Series*, pp. 1-11, Feb. 2009.
Itron, "Openway by Itron Security Overview," Itron White Paper, pp. 1-6, 2008.
Itron, "OpenWay® Security Overview," Itron White Paper, pp. 1-13, 2011.

* cited by examiner

SECURE REMOTE METER ACCESS

BACKGROUND

Historically, the meter readings that measure consumption of resources such as water, gas, or electricity has been accomplished manually by human meter readers at the customers' premises. The relatively recent advances in this area include collection of data by telephone lines, radio transmission, walk-by, or drive-by reading systems using radio communications between the meters and the meter reading devices. Although some of these methods require close physical proximity to the meters, they have become more desirable than the manual reading and recording of meter readings. In this regard, there has been a concerted effort to automate the collection of meter readings through the implementation of devices and messaging systems that allow data to flow from the meter to a host computing system with little or no human intervention. These systems are referred to in the art as Automated Metering Infrastructure ("AMI") and Automated Meter Reading ("AMR") systems.

In AMI and AMR systems, a transmitter/receiver may be implemented within a meter in order to encode and transmit data utilizing radio-based communications. The transmitter/receiver is a meter interface device attached to the meter, which either periodically transmits consumption data ("bubble-up") or receives a "wake up" polling signal containing a request for their meter information.

As increasing numbers of AMI/AMR systems are implemented, security has become increasingly more important, particularly from tampering with meters. As those skilled in the art will recognize, tampering with a meter may come in many different forms, all of which obtain unauthorized access to a meter for illegitimate purposes. To provide secure ways of communicating, asymmetric key cryptographic techniques have been implemented to secure communications between devices in a fixed network. In this instance, a service provider may utilize a private key to encode a digital signature for transmission to a meter. The source of a communication may be verified at a meter using a widely distributed public-key. Through the decoding of the digital signature, information may be securely exchanged between a meter and other devices in a fixed network. In this instance, the private key used to create a digital signature may be maintained at a centralized and physically secure location. In other words, data may be transmitted by a service provider over the fixed network without a private key that is used to encode the data being widely distributed.

However, mobile meter readers may be used to interact and communicate with meters. A deficiency in existing systems is the inability to provide a way of securely accessing a meter from a mobile meter reader. Preferably, access to a meter would be managed at a centralized computer system that is responsible for providing authorizations to mobile meter readers.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Generally described, the disclosed subject matter is directed to improved processes for performing secure communications with a meter. In accordance with one embodiment, a method of providing a mobile meter reader with an authorization for establishing a secure session with a meter is implemented. In particular, the method includes issuing a request for authorization to access the meter from the mobile meter reader. If the mobile meter reader maintains sufficient rights, an authorization having an encoded digital signature is generated at a host computer system and provided to the mobile meter reader. Then, the method formulates and transmits an authorization command to the meter having the encoded digital signature that was generated by the host computing system.

DESCRIPTION OF THE DRAWINGS

The foregoing aspects and many of the attendant advantages of the disclosed subject matter will become more readily appreciated as the same becomes better understood by reference to the following detailed description, when taken in conjunction with the accompanying drawings, wherein.

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. In this regard, the following disclosure first provides a general description of a meter reading system in which the disclosed subject matter may be implemented. Then, exemplary routines for securely accessing a meter from a mobile meter reader will be described. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

Figure 1:
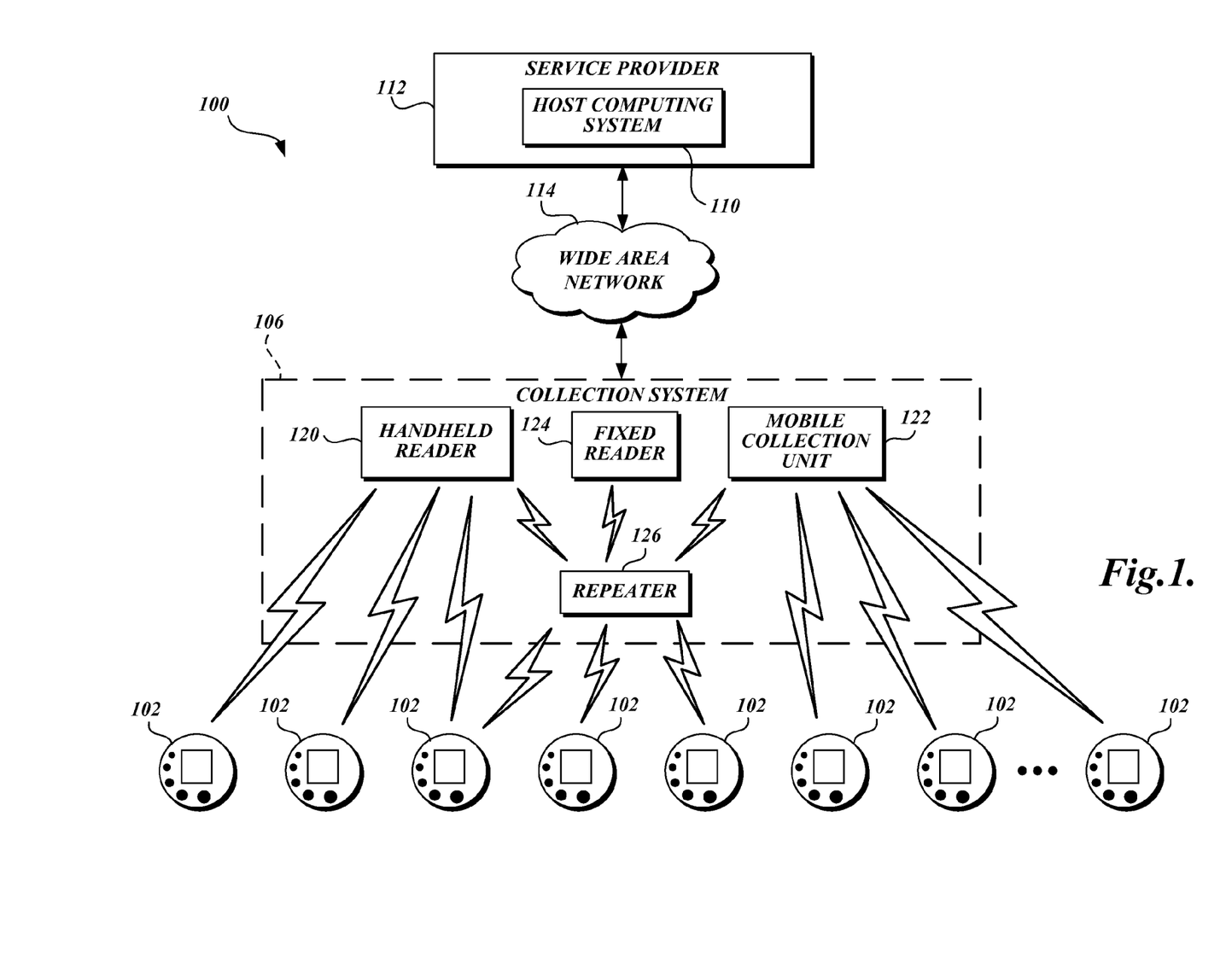
FIG. 1 is a block diagram depicting an illustrative metering environment suitable for collecting data from meters.

Referring now to FIG. 1, the following is intended to provide a general description of one embodiment of a communications system, such as a meter reading system 100, suitable for illustrating aspects of the disclosed subject matter. In one embodiment, the meter reading system 100 may be an AMI or AMR system that reads and monitors meters remotely. Generally described, the meter reading system 100 depicted in FIG. 1 includes a plurality of meters 102, a collection system 106, and a host computing system 110. The meters 102 are associated with, for example, transmitters/receivers for obtaining data, such as meter data (e.g., consumption data, tampering data, etc.) therefrom. The meters 102 in the meter reading system 100 may be a wired or wireless communications device capable of performing two-way communications with the collection system 106 utilizing AMI/AMR protocols. For example, the meters 102 are capable of receiving data (e.g., messages, commands, etc.) from the collection system 106 and transmitting meter data or other information to the collection system 106. Depending on the exact configuration and types of devices used, the meters 102 transmit standard meter readings either periodically ("bubble-up") in response to a wake-up signal or in a combination/hybrid configuration. In each instance, the meters 102 are configured to exchange data with one or more devices of the collection system 106.

Still referring to FIG. 1, the collection system 106 collects meter reading data and other data from the plurality of meters 102, processes the data, and forwards the data to the host computing system 110 of the utility service provider 112. The collection system 106 may employ any number of AMI/AMR protocols and devices to communicate with the meters 102. In the embodiment shown, the collection system 106, for example, may include a handheld meter reader 120 capable of radio-based collection and/or manual entry of meter readings. The collection system 106 may also include a mobile collection unit 122 (e.g., utility vehicle), configured with a radio transmitter/receiver for collecting meter readings within a drive-by coverage area. Collectively, these types of devices that are configured for the mobile collection of meter reading data will be referred to herein as a "mobile meter reader." In addition, the collection system 106, may also include, for example, a fixed network comprised of one or more fixed collection units 124. Each of the meter reading devices 120-124 may collect either directly from the meters 102, or indirectly via one or more optional repeaters 126. Those skilled in the art and others will recognize that other types of devices may be used then those illustrated in FIG. 1 and the specific device as illustrated should be construed as exemplary.

In the embodiment depicted in FIG. 1, the collection system 106 is configured to forward meter readings to the host computing system 110 over a wide area network 114, which may be implemented utilizing transmission control protocol over internet protocols (TCP/IP) (e.g., Internet), general packet radio service (GPRS) or other cellular-based protocols, Ethernet, WiFi, Broadband Over Power Line, and combinations thereof, etc. In one aspect, the collection system 106 serves as the bridge for transmitting data between devices that utilize AMI/AMR protocols (e.g., the meters 102) with computers (e.g., the host computing system 110) coupled to the wide area network 114. As mentioned previously, the collection system 106 is configured to receive meter reading data from one or more meters 102. The received data may be parsed and repackaged into a structured format suitable for transmission over the wide area network 114 to the host computing system 110. In this regard, meter reading data may be aggregated in a data store maintained at the host computing system 110. Accordingly, the host computing system 110 includes application logic for reading, processing, and managing the collection of meter data.

The discussion provided above with reference to FIG. 1 is intended as a brief, general description of one meter reading system 100 suitable for implementing aspects of the disclosed subject matter. While the description above is made with reference to particular devices linked together through different interfaces, those skilled in the art will appreciate that the claimed subject matter may be implemented in other contexts. In this regard, the claimed subject matter may be practiced using different types of devices and communication interfaces than those illustrated in FIG. 1.

Now with reference to FIG. 2, one exemplary component architecture for a mobile meter reader 200 will be described. As mentioned previously with reference to FIG. 1, the mobile meter reader 200 may be a handheld meter reader 120, a mobile collection unit 122 (e.g., utility vehicle), or any other device configured to perform mobile collection of meter reading data. Generally described, the mobile meter reader 200 includes a processor 202, a memory 204, and a clock 206 interconnected via one or more buses 208. In addition, the mobile meter reader 200 includes a network interface 210 comprising components for communicating with other devices over the wide area network 114 (FIG. 1), utilizing any appropriate protocol, such as GPRS or other cellular-based protocols, WiFi, and combinations thereof, etc. As further depicted in FIG. 2, the mobile meter reader 200 includes a radio-based communication device 212 for transmitting/receiving wireless communications with other radio-based devices (e.g., the meters 102). In particular, the communication device 212 includes at least one transceiver, transmitter-receiver, or the like, generally designated 218, of half-duplex (transmit or receive but not both simultaneously) or full-duplex design (transmit and receive simultaneously) that is capable of identifying, locating, and tracking signals that originate from the meters 102.

Figure 2:
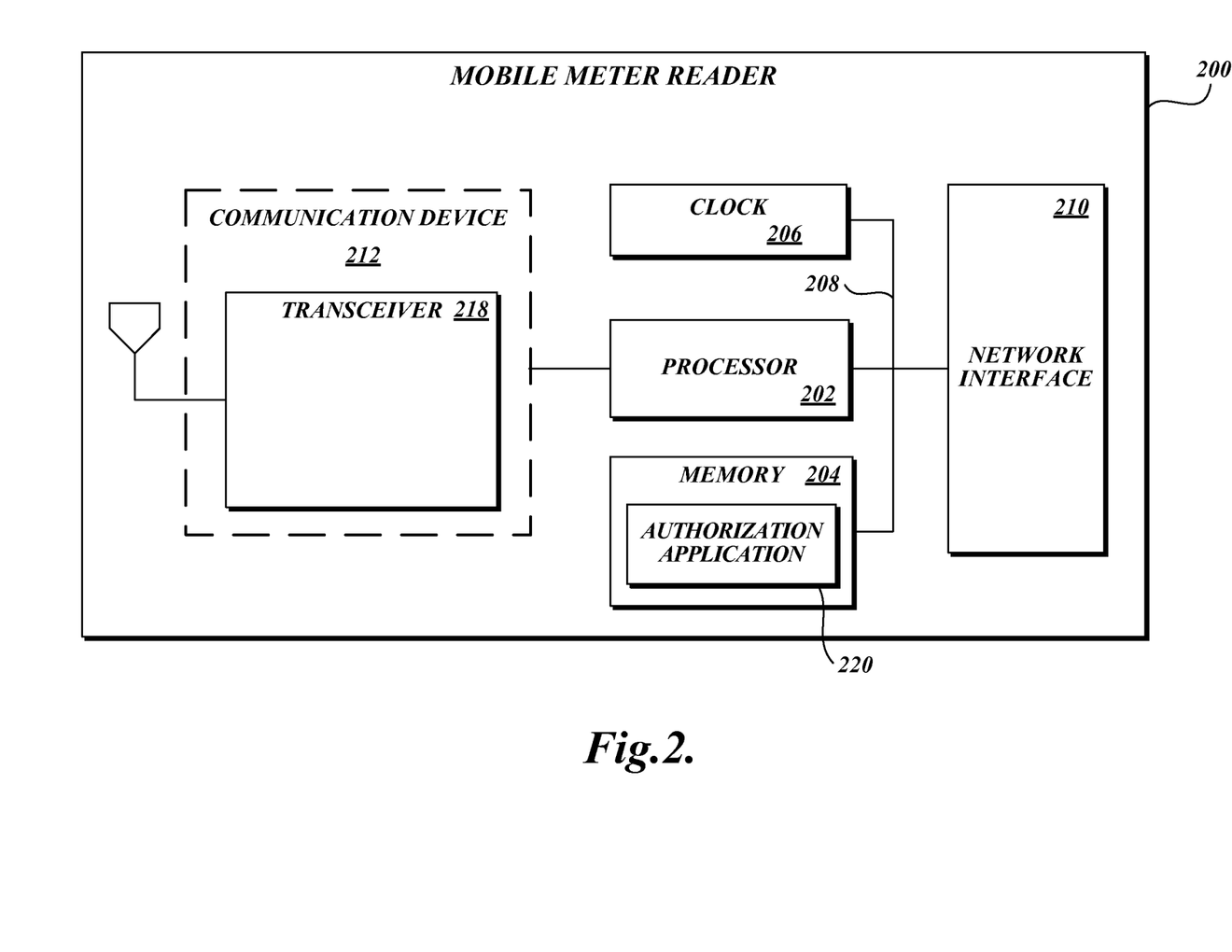
FIG. 2 is a block diagram illustrating components of a mobile meter reader suitable for establishing a secure session with a meter.

The memory 204 depicted in FIG. 2 is one example of computer-readable media suitable for storing data that is used to implement aspects of the disclosed subject matter. As used herein, the term "computer-readable media" includes volatile and non-volatile and removable and non-removable memory implemented in any method or technology capable of storing information, such as computer-readable instructions, data structures, program modules, or other data. In this regard, the memory 204 depicted in FIG. 2 is one example of a computer-readable media but other types of computer-readable media may be used.

As illustrated in FIG. 2, the memory 204 includes an authentication application 220 for allowing secure communications to be exchanged with one or more meters. In existing systems, a public key may be distributed to each meter in an AMI/AMR system to facilitate secure communication over a fixed network. The public key is used to decode a received digital signature and authenticate that a communication originated from a utility service provider. Unfortunately, the mobile meter reader 200 may have limited or intermittent network connectivity with the host computing system 110 over the wide area network 114. Distributing a private key to mobile meter readers for use in the field represents an unacceptable security vulnerability. Accordingly, the paradigm for authenticating communications in a fixed network is not readily applied to mobile devices such as the mobile meter reader 200. In one aspect, logic is implemented that allows the mobile meter reader 200 to serve as a conduit for interacting with meters in a way that leverages the paradigm of performing secure communications in a fixed network. In this regard, asymmetric key cryptographic techniques are employed to authenticate the mobile meter reader 200. Significantly, the authentication is performed without a private key being made available to the mobile meter reader 200. Instead, the authorization application 220 provides a way of securely accessing the meter 102 without distribution of a private key to the mobile meter reader 200. As a result, the loss or theft of the mobile meter reader 200 will not result in an unauthorized entity gaining access to the private key. Routines that implement aspects of the authorization application 220 will be described below with reference to FIGS. 4A-5.

Figure 3:
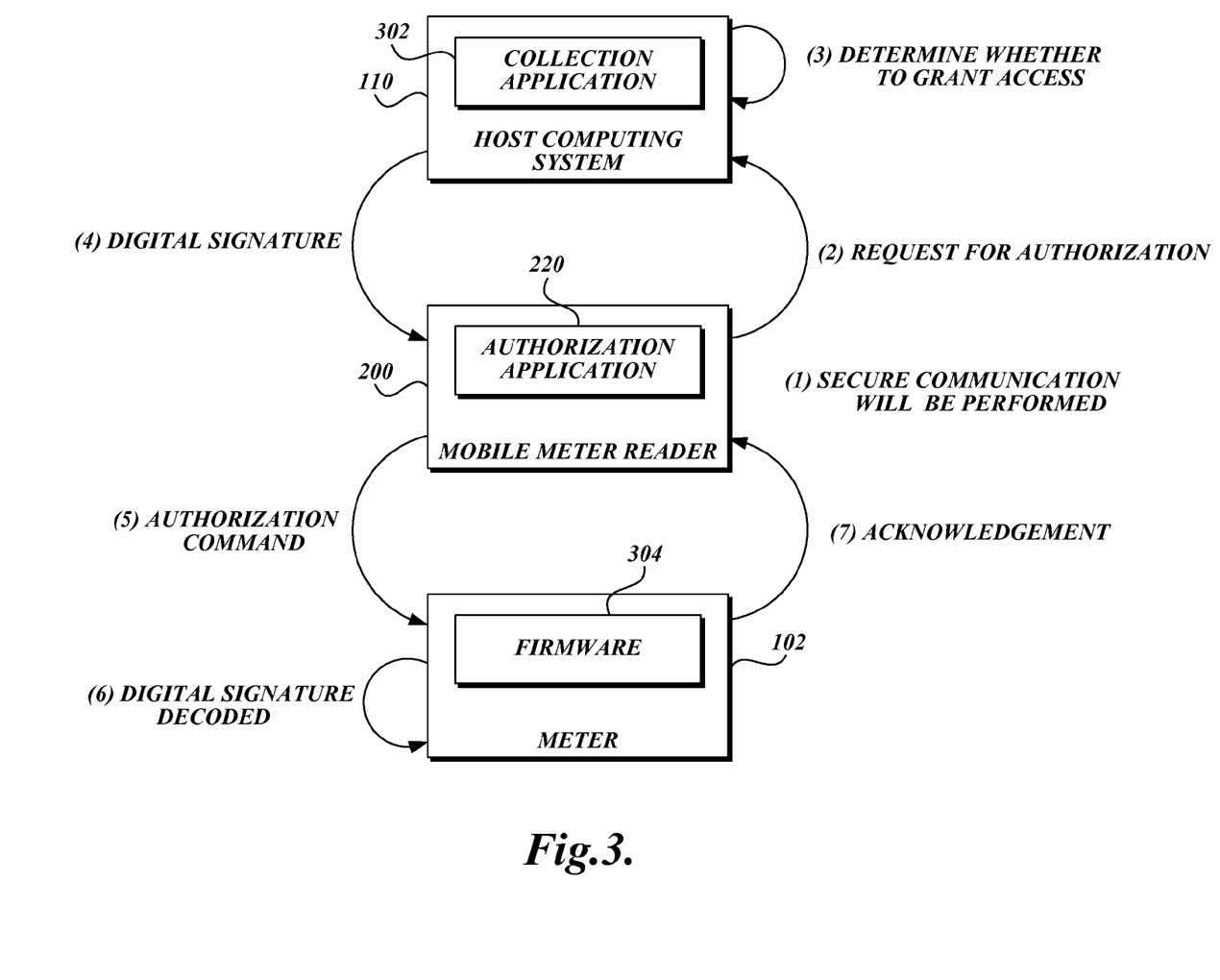
FIG. 3 is a block diagram illustrating the interactions between applications for performing secure communications with a meter.

Now with reference to FIG. 3, a general overview of the applications used to implement aspects of the disclosed subject matter is described. In this regard, FIG. 3 includes the host computing system 110, mobile meter reader 200, and meters 102 described above with reference to FIGS. 1 and 2.

In this regard, the host computing system 110 maintains a collection application 302 for storing and managing the collection of meter reading data obtained from the meters 102. Processing is performed to analyze collected data and determine whether commands or additional requests for data will be propagated to the meters 102. Alternatively, service personnel may interact with the collection application 302 to initiate interactions with the meters 102. In one aspect, the collection application 302 interacts with the authorization application 220 to manage access to the meters 102. In this regard, the collection application 302 may generate a digital signature when the authorization application 220 issues a request to establish a secure session with the meter 102. The authorization application 220 may use the digital signature to initiate a secure session with the meter 102. In turn, the firmware 304 implemented at the meter 102 uses a public key to decode the digital signature originating from the host computing system 110. In instances when the digital signature is validated, a secure session between the mobile meter reader 200 and meter 102 may be established. Significantly, the logic collectively implemented by the collection application 302, the authorization application 220, and the meter firmware 304 allow a mobile meter reader 200 to perform secure communications with the meter 102 without having access to the private key used to create the digital signature.

The flow of data between applications in accordance with one embodiment is further depicted in FIG. 3. At event (1), the authorization application 220 executed on the mobile meter reader 200 determines that a secure communication with the meter 102 will be performed. Then, at event (2), the authentication application 220 generates and transmits a request for authorization to access a particular meter to the host computing system 110. In some instances, a network connection with the host computing system 110 may not be available from the mobile meter reader 200. Accordingly, the transmission of the request, at event (2), may occur, for example, as a batch process in anticipation of using the mobile meter reader 200 in the field. Alternatively, the authorization application 220 may generate the request dynamically, at event (2), if a network connection will be available to the mobile meter reader 200.

Upon receipt of the request, the collection application 302 determines whether the mobile meter reader 200 is authorized to access the meter 102, at event (3). In instances when a determination is made to allow access, a private key is used to create a digital signature suitable for validating that the utility service provider is the source a communication. In this regard, the digital signature created at the host computing system 110 and transmitted to the mobile meter reader 200, at event (4), is encoded such that the private key is not made available to the mobile meter reader 200. Instead, access to the private key is tightly controlled at the host computing system 110 without being distributed to the mobile meter reader 200. Once the mobile meter reader 200 receives the digital signature, at event (4), the authorization application 220 may formulate an authentication command to establish a secure session with the meter 102. Then, at event (5), a communication that includes the authentication command and digital signature is transmitted to the meter 102. The meter firmware 304 decodes the digital signature in the authentication command using a widely distributed public-key, at event (6). In turn, the meter 102 may return an acknowledgment that the secure session was established and/or any requested data to the mobile meter reader, at event (7). During the secure session, the mobile meter reader 200 may formulate and transmit additional commands that are satisfied by the meter 102 without requiring additional communications with the host computing system 110.

Now, with reference to FIGS. 4A-B, routines 400 and 450 for obtaining an authorization to access a mobile meter reader will be described. In some instances, a mobile meter reader is able to maintain network connectivity with a service provider while in the field. For example, if the route for collecting meter readings is in a geographic area where wireless connectivity is available, than then the mobile meter reader may be able to query and perform network communications with the host computing system 110 on demand. In this embodiment, the dynamic authorization routine 400 (FIG. 4A) may be used to obtain real-time authorization to access a meter. However, in other instances, wireless connectivity may be intermittent or unavailable. Moreover, a mobile meter reader may not be configured with hardware and/or software components for performing network communications. In this instance, the batch authorization routine 450 (FIG. 4B) may be used to obtain authorization to access a meter. In each of these embodiments, authorizations for access provided to the mobile meter reader is managed and controlled from a centralized location, namely, the host computing system 110.

Figure 4A:
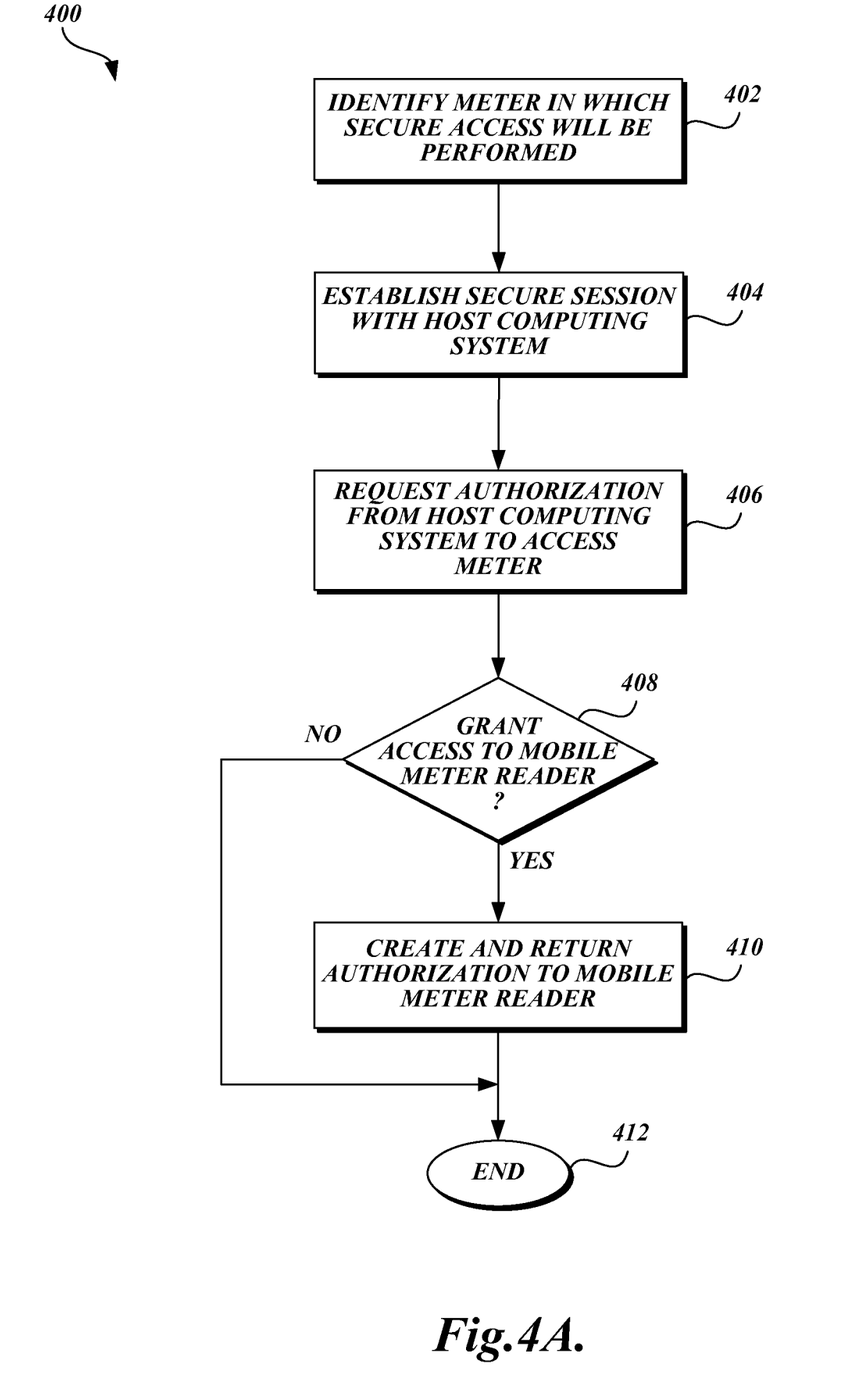
FIGS. 4A-4B are flow diagrams depicting exemplary routines for obtaining authorization to access a meter from a host computing system.

As illustrated in FIG. 4A, the dynamic authorization routine 400 begins at block 402, where a mobile meter reader identifies a particular meter in which secure communications will be performed. As mentioned previously, existing metering infrastructure allows a mobile meter reader to communicate with a meter. For example, some existing meters may be configured to periodically transmit a standard consumption message. The standard consumption message typically includes a serial number that uniquely identifies the meter where the message originated. By way of another example, the mobile meter reader may transmit a "wake-up" signal to initiate communication and obtain a standard consumption message from a meter. In this instance, the mobile meter reader may perform a login with the meter in order to obtain a standard consumption message. The login procedure may request and obtain a password before granting read-only access to meter data. In this regard, some meters may be configured to require completion of a password-protected login procedure before any meter data can be accessed. Aspects of the disclosed subject are compatible with different types of meters including meters that require this type of login procedure to be performed.

At block 404 of the dynamic authorization routine 400, the mobile meter reader establishes a secure session with the host collection system 110. In one embodiment, the secure session established at block 404 may utilize conventional IP-based handshake protocols, such as the Secure Socket Layer ("SSL") protocol. As those skilled in the art and others will recognize, conventional IP-based protocols such as SSL provide a way of encapsulating and exchanging authentication information. Once established, only encrypted information is communicated between remote devices that are participating in the session. In this regard, the secure session may be established at block 404 using components of the network interface 210 described above with reference to FIG. 2.

At block 406 of the dynamic authorization routine 400, the mobile meter reader requests authorization from the host computing system 110 to access a meter. Specifically, the mobile meter reader generates and transmits a communication within the secure session established at block 404 that includes the request. The communication may include a unique serial number associated with the meter identified at block 402 and the level of access rights being requested. In one embodiment, the host computing system 110 maintains a data store for tracking which meters may be accessed by a mobile meter reader. Moreover, the data store also tracks the level of access rights that may be granted to implement the desired functionality. Upon receiving the request at block 406, a lookup is performed in the data store maintained at the host computing system 110. Based on the lookup, a determination is made, at block 408, regarding whether access to the meter will be granted. In instances when the mobile meter reader does not have authorization to access the meter, the request received at block 406 is denied and the dynamic authorization routine 400 proceeds to block 412, where it terminates. Conversely, if the mobile meter reader is authorized to access the meter, the dynamic authorization routine 400 proceeds to block 410.

At block 410, a digital signature is created using a private key that is centrally managed at the host computing system 110. Those skilled in the art and others will recognize that a digital signature is a set of encoded data that uniquely identifies the source of a transmission. In this regard, the process of creating a digital signature may involve encoding data into a seemingly unintelligible form using a "hash" function. Any modifications after encoding will result in values indicative of tampering when the digital signature is decoded. Accordingly, the digital signature can not readily be forged and insures that data being communicated over a network connection has not been altered. Once generated, the digital signature is returned to the requesting mobile meter reader over the secure SSL connection. Then, the dynamic authorization routine 400 proceeds to block 412, where it terminates. As described in further detail below with reference to FIG. 5, the mobile meter reader may use the digital signature provided by the host computing system 110 to be authenticated by a meter.

Figure 4B:
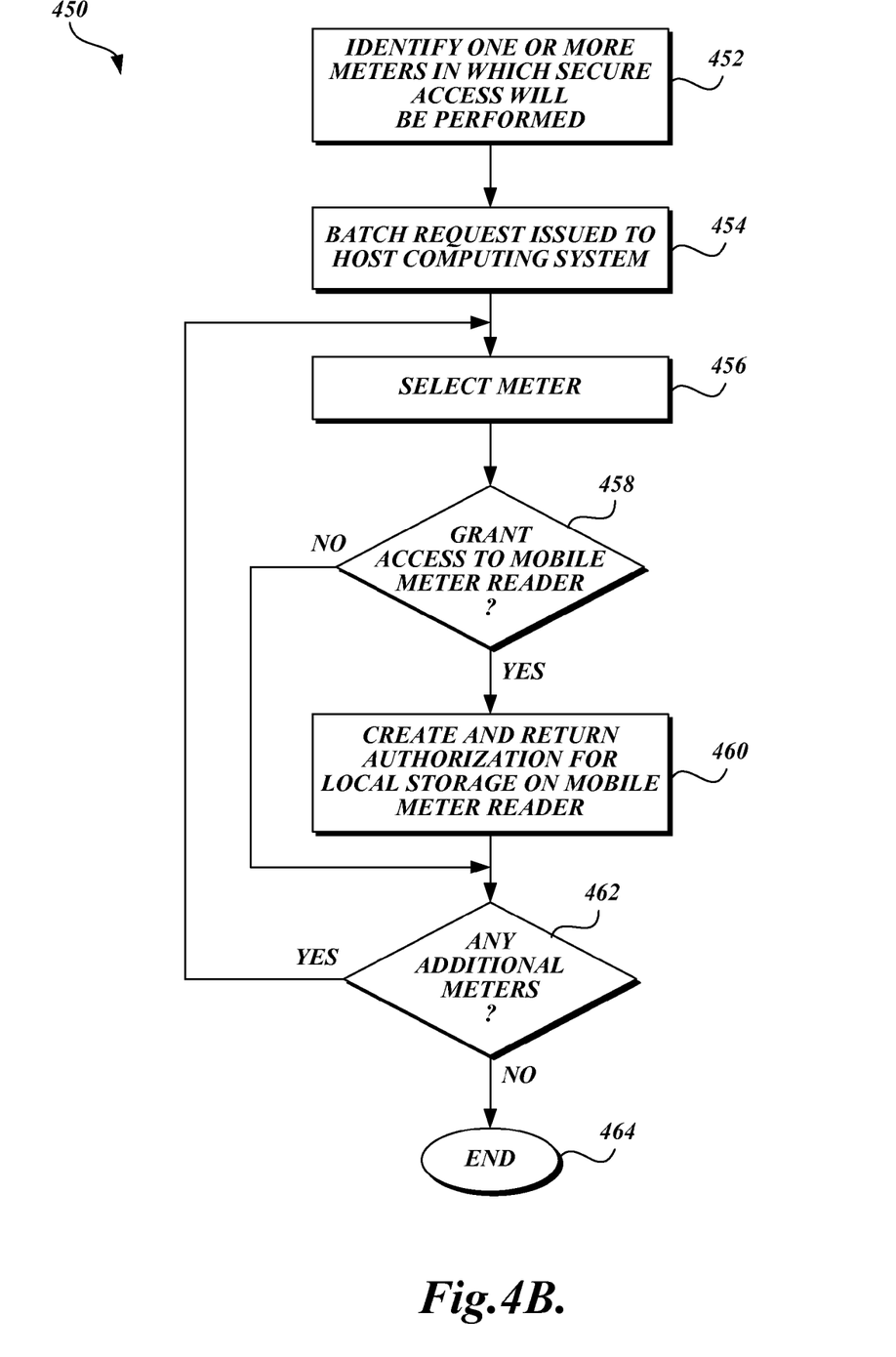

Now with reference to FIG. 4B, a batch authorization routine 450 for obtaining authorization to access a mobile meter reader is described. As illustrated in FIG. 4B, the batch authorization routine 450 begins at block 452, where a mobile meter reader identifies one or more meters in which secure access will be performed. In instances when an IP network connection will not be available, authorizations may be obtained from the host computing system 110 in preparation of proceeding into the field. At a service provider depot, a mobile meter reader may interface with the host computing system 110 to request one or more authorizations. In this regard, existing systems may be used to identify which meters are scheduled to be accessed by the mobile meter reader.

At block 454 of the batch authorization routine 400, the mobile meter reader issues a batch request for authorization to access a plurality of meters. A mobile meter reader may regularly interface with the host computing system 110 over a local network connection, direct communication link, etc. For example, meter readings collected and stored locally on the mobile meter reader may be synchronized with data maintained at the host computing system 110 upon completion of being used in the field. Once a connection exists, a request for authorization to access at least one meter in anticipation of performing future field work may be generated and communicated to the host computing system 110. Similar to the description provided with reference to FIG. 4A, the request communicated to the host computing system 110 may include a unique serial number associated with the meters scheduled to be accessed and the level of access rights that is being requested.

At block 456 of the batch authorization routine 450, a meter identified in a batch authorization request is selected. Then, at block 458, a determination is made regarding whether the mobile meter reader will be granted access to the selected meter. As mentioned previously, the host computing system 110 maintains a data store for tracking which meters may be accessed by a particular mobile meter reader and the level of access rights that may be granted. Upon selecting a meter, a lookup is performed in the data store. Based on the lookup, a determination is made, at block 458, regarding whether to grant the mobile meter reader access to the selected meter. In instances when sufficient access rights do not exist, the request to access the meter is denied and the batch authorization routine 450 proceeds to block 462 described in further detail below. Conversely, if sufficient rights to access the meter exist, the batch authorization routine 450 proceeds to block 460.

At block 460, a digital signature is created at the host computing system 110 using a tightly-controlled private key. As mentioned previously, a digital signature may be used to validate the source of a transmission. In this regard, the process of creating the digital signature may involve encoding data into a seemingly unintelligible form using a "hash" function. Any modifications after encoding will result in result values indicative of tampering when the digital signature is decoded. Once generated, the digital signature is returned to the mobile meter reader and maintained in local storage.

At decision block 462, a determination is made regarding whether any additional meters will be selected by the batch authorization routine 450. Each meter in the batch is sequentially selected and a determination is made regarding whether access to the meter will be granted. In instances when access will be granted, a digital signature is provided and stored locally on the mobile meter reader. In this regard, the digital signature may be subsequently retrieved from storage and used in the field to gain secure access to a particular meter. In instances when the result of the test performed at block 464 is "yes" and additional meters will be selected, the batch authorization routine 450 proceeds back to block 454 and blocks 454-462 repeat. Once all of the meters in the batch have been selected, the result of the test performed at block 462 will be "no" and the batch authorization routine 450 proceeds to block 464, where it terminates.

It should be well understood that the dynamic authorization routine 400 and batch authorization routine 450 described above with reference to FIGS. 4A-B do not show all of the functions performed when managing access to one or more meters. Instead, the routines 400 and 450 provide embodiments that should be construed as exemplary. Those skilled in the art and others will recognize that some functions and/or exchanges of data described above may be performed in a different order, omitted/added, or otherwise varied without departing from the scope of the claimed subject matter.

Now, with reference to FIG. 5, an access routine 500 for establishing a secure communication session with a meter will be described. In the embodiment described above with reference to FIG. 4A, authorization to access a meter is obtained dynamically when the mobile meter reader interacts with a meter in the field. In this instance, the dynamic authorization routine 400 and the access routine 500 may be performed at or near the same time. Alternatively, receiving authorization to access one or more meters from the host computing system 110 may occur as a batch process with digital signatures being cached in storage on the mobile meter reader. In either instance, the access routine 500 implements logic that allows a mobile meter reader to gain secure access to a meter using an authorization provided by the host computing system 110.

Figure 5:
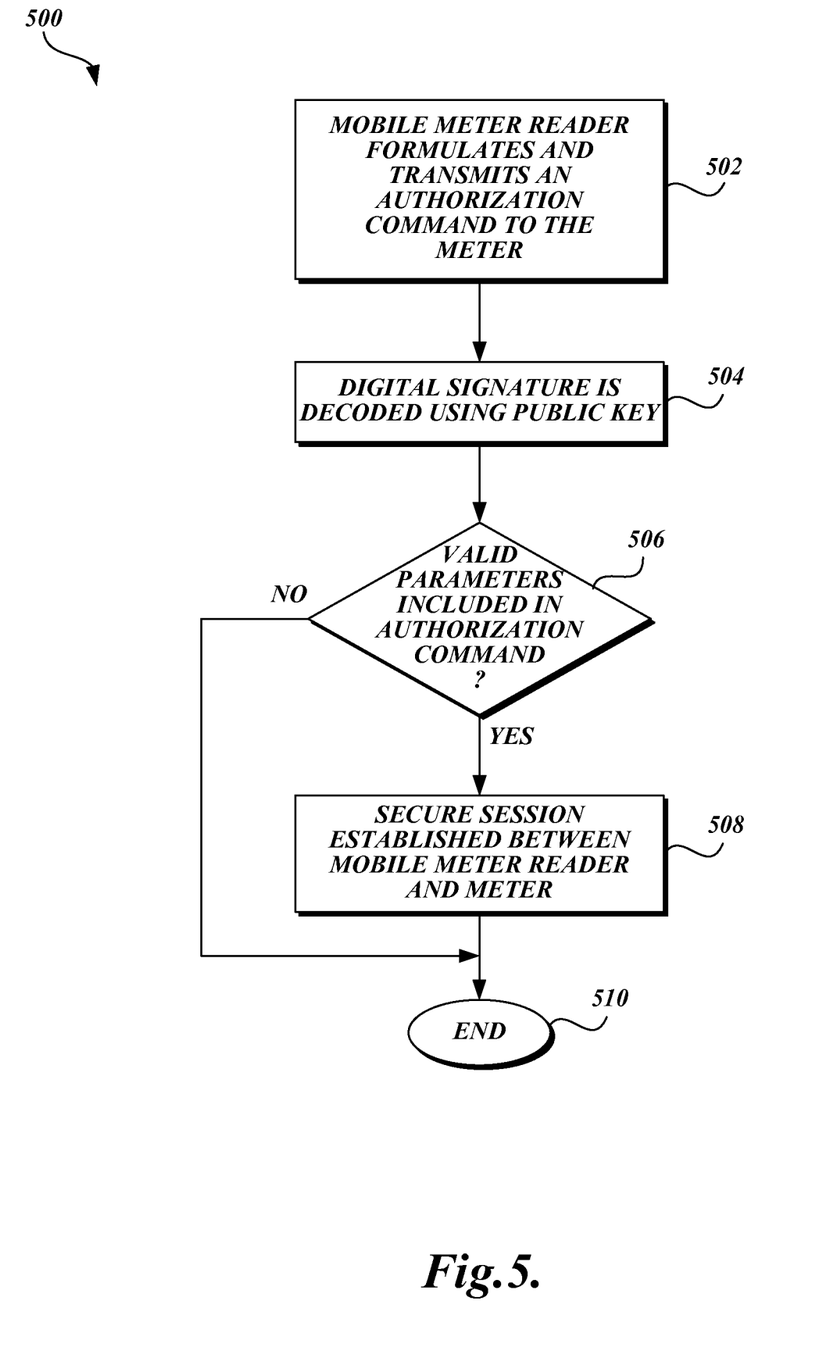
FIG. 5 is a flow diagram of one exemplary routine for establishing a secure session with a meter.

As illustrated in FIG. 5, the access routine 500 begins at block 502 where a mobile meter reader formulates and transmits an authorization command to establish a secure session with a meter. In one embodiment, the authorization command includes a timestamp, authorization level, digital signature, as well as unique identifiers for the mobile meter reader and meter that will participate in the secure session. As mentioned previously, the mobile meter reader is configured to perform two-way communications with a meter utilizing existing AMI/AMR protocols. Accordingly, the formulation and transmission of the authorization command, at block 502, may include encapsulating command data into a standardized message format.

Upon receiving the authorization command, the meter uses a public key to decode the received digital signature, at block 504. Once the digital signature is decoded, a determination is made, at block 506, regarding whether the authorization command includes a set of valid parameters that will allow a secure session to be established. In particular, decoding the digital signature and calculating a hash value may indicate that the authentication command included a forged or invalid digital signature. By way of another example, the authorization command may not include the correct serial number of the meter being accessed. Moreover, aspects of the present disclosure allow a service provider to issue an authorization that is limited to a specific time window. Accordingly, the timestamp received in the authentication command is compared to the time window in which authorized access was granted. The result of the comparison may indicate that the received digital signature has expired. In these instances when a secure session with the meter will not be permitted, the result of the test performed at block 506 is "no" and the access routine 500 proceeds to block 510, where it terminates. When access is denied, error handling may be performed to notify the mobile meter reader of the access violation. In addition, the attempted access may be memorialized or "logged" on the meter and subsequently used to detect attempts at tampering with the meter. Conversely, if valid parameters are provided in the authorization command and a secure session with the meter will be established, the result of the test performed at block 506 is "yes" and the routine 500 proceeds to block 508.

At block 508 of the dynamic authentication routine 500, a secure session with the meter is established. If block 508 is reached, the authentication command received by a meter provided valid parameters that will allow a secure session to be established. During the secure session, a series of encrypted messages may be exchanged. In this regard, the secure session has associated cryptographic keys for encoding and decoding messages without having to perform any additional authentications. Even though a secure session is established, the authority of the mobile meter reader 200 to access specific procedures of the meter 102 may be limited. As mentioned previously, the mobile meter reader 200 is allocated a particular authorization level by the host computing system 110. In other words, a service provider is able to limit authorizations to a level that is necessary to perform the desired tasks. When procedures of the meter are accessed during the secure session, a check is performed to determine whether sufficient authorization exists to activate the procedure. Accordingly, aspects of the disclosed subject matter allow a service provider to control, manage, and limit the procedures that may be performed during the secure session, thereby providing an additional layer of security against unauthorized tampering. In any event, the duration of the secure session may be explicitly terminated or "timeout" after pre-determined amount of time. Once the secure session closes, the access routine 500 proceeds to block 510, where it terminates.

While illustrative embodiments have been illustrated and described, it will be appreciated that various changes can be made therein without departing from the spirit and scope of the claimed subject matter.

The embodiments of the invention in which an exclusive property or privilege is claimed are defined as follows:

1. A method of securely accessing a meter from a mobile meter reader, the method comprising:
   identifying, from a plurality of meters, a first one of the meters scheduled to be accessed in a first area in which the mobile meter reader is likely unable to communicate with a host computing system via a network communication;
   identifying, from the plurality of meters, a second one of the meters scheduled to be accessed in a second area in which the mobile meter reader is likely able to communicate with the host computing system via the network communication;
   before the mobile meter reader is taken to the first area and while the mobile meter reader is in communication with the host computing system:
      issuing a first request for authorization to access the first one of the meters, the first request for authorization being issued from the mobile meter reader to the host computing system; and
      when the mobile meter reader has sufficient rights to access the first one of the meters, storing a digital signature received from the host computing system that identifies that the mobile meter reader is authorized to communicate with the first one of the meters;
   when the mobile meter reader is located in the first area, transmitting an authorization command to the first one of the meters from the mobile meter reader, wherein the authorization command includes the digital signature received from the host computing system before the mobile meter reader was located in the first area; and
   when the mobile meter reader is located in the second area, utilizing the network communication to dynamically issue a second request for authorization to access the second one of the meters, the second request for authorization being issued from the mobile meter reader to the host computing system while the mobile meter reader interacts with the second one of the meters.

2. The method as recited in claim 1, wherein the first one of the meters is to:
   decode the digital signature;
   determine whether the digital signature is authentic; and
   when the digital signature is authentic, establish a secure session between the first one of the meters and the mobile meter reader.

3. The method as recited in claim 2, wherein encrypted data is transmitted between the first one of the meters and the mobile meter reader during the secure session.

4. The method as recited in claim 1, wherein the authorization command is formulated to be verified by a public key on the first one of the meters used for authenticating communications to decode the digital signature.

5. The method as recited in claim 1, wherein issuing the first request for authorization to access the first one of the meters from the mobile meter reader includes identifying a unique identifier associated with the first one of the meters that is scheduled to be accessed by the mobile meter reader when the mobile meter reader is located in the first area.

6. The method as recited in claim 1, wherein the network communication comprises an IP-based network connection.

7. The method as recited in claim 1, wherein the first request for authorization is issued to the host computing system as a batch process that identifies multiple meters, including the first one of the meters, located in the first area.

8. The method as recited in claim 1, wherein the digital signature provided by the host computing system is configured to expire after a pre-determined period of time.

9. The method as recited in claim 1, wherein the digital signature provided by the host computing system is configured with an access level that defines which procedures on the first one of the meters may be utilized by the mobile meter reader.

10. The method as recited in claim 1, wherein the mobile meter reader comprises at least one of a handheld meter reader or a mobile collection unit.

11. A host computing device comprising:
memory comprising machine-readable instructions; and
a processor that, when executing the machine-readable instructions, causes the host computing device to:
identify, from a plurality of meters, a first one of the meters scheduled to be accessed in a first area in which a mobile meter reader is likely unable to communicate with a host computing system via a network communication;
identify, from the plurality of meters, a second one of the meters scheduled to be accessed in a second area in which the mobile meter reader is likely able to communicate with the host computing system via the network communication;
receive, from the mobile meter reader before the mobile meter reader is located in the first area and while the mobile meter reader is in communication with the host computing system, a first request for authorization to access the first one of the meters before the mobile meter reader is located in the first area and if the mobile meter reader has sufficient rights to access the first one of the meters, provide a digital signature to the mobile meter reader that identifies that the mobile meter reader is authorized to communicate with the first one of the meters, wherein the mobile meter reader is to formulate an authorization command including the digital signature for transmission to the first one of the meters to activate a secure procedure of the first one of the meters, and wherein the first one of the meters is to decode the digital signature and to activate the secure procedure if the digital signature is authentic; and
receive, from the mobile meter reader when the mobile meter reader is located in the second area, a dynamically issued second request via the network communication for authorization of the mobile meter reader to access the second one of the meters, the second request for authorization being issued while the mobile meter reader interacts with the second one of the meters.

12. The host computing device as recited in claim 11, wherein the host computing device is to maintain a centralized data store for tracking which of the plurality of meters may be accessed by the mobile meter reader.

13. The host computing device as recited in claim 11, wherein an access level is defined in the digital signature provided by the host computer system, and wherein the first one of the meters is to identify the access level for the mobile meter reader.

14. The host computing device as recited in claim 11, wherein the digital signature includes a time stamp, and wherein the first one of the meters is to compare the time stamp provided by the mobile meter reader with a predetermined time window to determine whether the digital signature generated by the host computing system has expired.

15. The host computing device as recited in claim 11, wherein the request received from the mobile meter reader includes a meter serial number, and wherein the host computing device is to compare the serial number with a list of serial numbers for which the mobile meter reader is authorized to access.

16. The system as recited in claim 11, wherein the mobile meter reader comprises at least one of a handheld meter reader or a mobile collection unit.

17. A mobile meter reader, comprising:
a processor;
an interface to communicate with a host computing system, wherein the mobile meter reader is expected to lose connectivity with the host computing system while servicing a first meter while located in a first area including the first meter;
a radio-based communication device to communicate with the first meter; and
a computer-readable media having computer-executable instructions that, when executed by the processor, cause the mobile meter reader to:
when the mobile meter reader is scheduled to service a second meter located in a second area in which continuous connectivity with the host computing system is expected, utilize a network communication to dynamically obtain authorization from the host computing system to access the second meter while the mobile meter reader is located in the second area and interacts with the second meter;
when the mobile meter reader is scheduled to service the first meter:
request authorization from the host computing system to access the first meter before entering the first area and while in communication with the host computing system via the interface;
store an encoded digital signature provided by the host computing system before the mobile meter reader is located in the first area, wherein the digital signature is provided if the mobile meter reader has sufficient rights to access the first meter, and wherein the digital signature identifies that the mobile meter reader is authorized to communicate with the first meter;
formulate an authorization command for transmission to the first meter including the encoded digital signature to activate a secure procedure of the first meter; and
establish a secure session with the first meter.

18. The mobile meter reader as recited in claim 17, wherein the authorization command formulated by the mobile meter reader is to be verified by an asymmetric public key used for decoding communications at the first meter.

19. The mobile meter reader as recited in claim 17, wherein the network communication comprises an IP-based network connection.

20. The mobile meter reader as recited in claim 17, wherein the digital signature for accessing the first meter is obtained as a batch process that identifies multiple meters scheduled to be accessed in the first area in which the mobile meter reader is expected to lose connectivity with the host computing system.

21. The mobile meter reader as recited in claim 17, wherein formulating the authorization command includes satisfying a password protected login procedure with the first meter.

22. The mobile meter reader as recited in claim 17, wherein the authorization command includes at least a current time stamp, an authorization level, and a unique identifier associated with the first meter.

23. The mobile meter reader as recited in claim 17, wherein the mobile meter reader comprises at least one of a handheld meter reader or a mobile collection unit.

24. A method of securely accessing a meter in a network from a mobile meter reader comprising:
determining first service instances in which network connectivity is likely unavailable when the mobile meter reader is deployed in a field of service;
determining second service instances in which network connectivity is likely available when the mobile meter reader is deployed in the field of service;
if one of the first service instances is scheduled:
requesting an authorization to access a first meter corresponding to the scheduled one of the first service instances, wherein the request is issued from the mobile meter reader to a host computing system at a first time prior to deployment of the mobile meter reader in the field of service;
storing a digital signature received from the host computing system in memory of the mobile meter reader, wherein the digital signature is provided if the mobile meter reader has sufficient rights to access the first meter, and wherein the digital signature identifies that the mobile meter reader is authorized to communicate with the first meter; and
utilizing the stored digital signature after being deployed in the field of service to provide authorization to the first meter, wherein the digital signature is created at the host computing system using a private key, wherein the host computing system withholds the private key from the mobile meter reader; and
if one of the second service instances is scheduled, utilizing a network communication after being deployed in the field of service to dynamically request authorization to access a second meter corresponding to the scheduled one of the second service instances, the request for authorization being issued while the mobile meter reader interacts with the second meter.

25. The method as recited in claim 24, wherein the first meter is to process the authorization for access from the mobile meter reader, and wherein the first meter is to grant communication access to the mobile meter reader when the digital signature is validated at the first meter using a public key.

26. The method as recited in claim 25, further comprising establishing a secure connection between the mobile meter reader and the first meter when the communication access is granted by the first meter.

27. The method as recited in claim 24, wherein the authorization transmitted to the first meter from the mobile meter reader includes an authorization command generated by the mobile meter reader.

28. The method as recited in claim 24, wherein the mobile meter reader is not in communication with the host computing system when providing the authorization to the first meter.

29. The method as in claim 24, wherein requesting the authorization to access the first meter comprises a batch authorization request.

* * * * *